US009565264B1

United States Patent
Bertz et al.

(10) Patent No.: US 9,565,264 B1
(45) Date of Patent: *Feb. 7, 2017

(54) TRUE PUSH ARCHITECTURE FOR INTERNET PROTOCOL NOTIFICATION

(71) Applicant: Sprint Communications Company L.P., Overland Park, KS (US)

(72) Inventors: Lyle T. Bertz, Lee's Summit, MO (US); Robert H. Burcham, Overland Park, KS (US); Brian D. Mauer, Shawnee, KS (US); Jason Salge, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/080,546

(22) Filed: Mar. 24, 2016

Related U.S. Application Data

(63) Continuation of application No. 13/949,228, filed on Jul. 24, 2013, now Pat. No. 9,330,053.

(51) Int. Cl.
*H04L 29/08* (2006.01)
*H04L 29/12* (2006.01)
*G06F 9/44* (2006.01)
*G06F 3/06* (2006.01)

(52) U.S. Cl.
CPC ............ *H04L 67/26* (2013.01); *G06F 3/061* (2013.01); *G06F 3/0655* (2013.01); *G06F 3/0679* (2013.01); *G06F 9/4401* (2013.01); *H04L 61/2007* (2013.01); *H04L 67/02* (2013.01)

(58) Field of Classification Search
CPC ........ H04L 67/02; H04L 67/10; H04L 47/822; H04L 41/50; H04L 47/788; H04L 47/70
See application file for complete search history.

(56) References Cited

U.S. PATENT DOCUMENTS

| | | | | |
|---|---|---|---|---|
| 9,330,053 B1* | 5/2016 | Bertz | ............... | G06F 15/17306 |
| 2010/0061643 A1* | 3/2010 | Fukuhara | ............... | H04N 19/63 382/232 |
| 2014/0359130 A1* | 12/2014 | Southern | ............... | H04L 47/70 709/226 |

OTHER PUBLICATIONS

First Action Interview Pre-Interview Communication dated Nov. 2, 2015, U.S. Appl. No. 13/949,228, filed Jul. 24, 2013.
Notice of Allowance dated Dec. 29, 2015, U.S. Appl. No. 13/949,228, filed Jul. 24, 2013.

* cited by examiner

*Primary Examiner* — Kim T Nguyen

(57) ABSTRACT

A method of true push for internet protocol notification to a mobile communication device implemented by at least one server computer. The method comprises determining the size of physically addressable random access memory (RAM) and the number of central processing unit (CPU) cores of the server computer at boot time and setting the resource limit, rlimit, in the kernel of the server computer that comprises setting the limit for the total number of file handles in the entire system automatically based on the determined size of the random access memory and the determined number of the central processing unit cores at boot time. The method further comprises tying the memory page allocation into the setting of the kernel parameters, whereby the input/output (I/O) maintenance of the server computer is maximized for concurrent web sockets so that the server computer is optimized for implementing the true push for internet protocol notification.

20 Claims, 7 Drawing Sheets

TRUE PUSH ARCHITECTURE FOR INTERNET PROTOCOL NOTIFICATION

CROSS-REFERENCE TO RELATED APPLICATIONS

This application is a continuation of and claims priority under 35 U.S.C. §120 to U.S. patent application Ser. No. 13/949,228, filed on Jul. 24, 2013, entitled "True Push Architecture for Internet Protocol Notification", by Lyle T. Bertz, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Data network capable electronic devices are becoming increasingly prevalent in our daily lives. Additionally, more and more electronic devices that did not have data network capabilities are being provided with data network capabilities. With the rapid development and popularization of data network capable electronic devices, a wide variety of increasingly sophisticated techniques are being deployed by electronic device manufacturers and wireless communications service providers to help in marketing and promoting applications and brands to data network capable electronic devices. The development of online application stores also helps distribute applications and advertisements across the network. However, too many or too frequent advertisements and their impact on the user experience may have implications for user satisfaction with the electronic device manufacturer and/or the wireless communications service provider.

SUMMARY

In an embodiment, a method of true push for internet protocol notification to a mobile communication device implemented by at least one server computer is disclosed. The method comprises determining the size of physically addressable random access memory (RAM) and the number of central processing unit (CPU) cores of the server computer at boot time and setting the resource limit, rlimit, in the kernel of the server computer that comprises setting the limit for the total number of file handles in the entire system automatically based on the determined size of the random access memory and the determined number of the central processing unit cores at boot time. The method further comprises tying the memory page allocation into the setting of the kernel parameters and setting the central processing unit core affinity to a single thread for the server computer by an application on the server computer to avoid context switching between applications, whereby the input/output (I/O) maintenance of the server computer is maximized for concurrent web sockets so that the server computer is optimized for implementing the true push for internet protocol notification.

In an embodiment, a method of true push for internet protocol notification to a mobile phone implemented by at least one server computer is disclosed. The method comprises determining the size of physically addressable random access memory and the number of central processing unit cores of the server computer at boot time to change kernel parameter settings, tying the memory page allocation into the setting of the kernel parameter for the server computer and setting the number of file handles automatically for the server computer based on the determined size of the random access memory and the determined number of central processing unit cores at boot time, whereby the input/output maintenance of the server computer is maximized for concurrent web sockets so that the server computer is optimized for implementing the true push for internet protocol notification.

In an embodiment, a method of true push for internet protocol notification implemented by at least one server computer is disclosed. The method comprises determining the size of physically addressable random access memory and the number of central processing unit cores of the server computer at boot time and changing parameters on the kernel of the server computer based on the size of the physically addressable random access memory and the number of central processing unit cores at boot time, whereby the input/output maintenance of the server computer is maximized so that the server computer is optimized for implementing true push for internet protocol notification.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
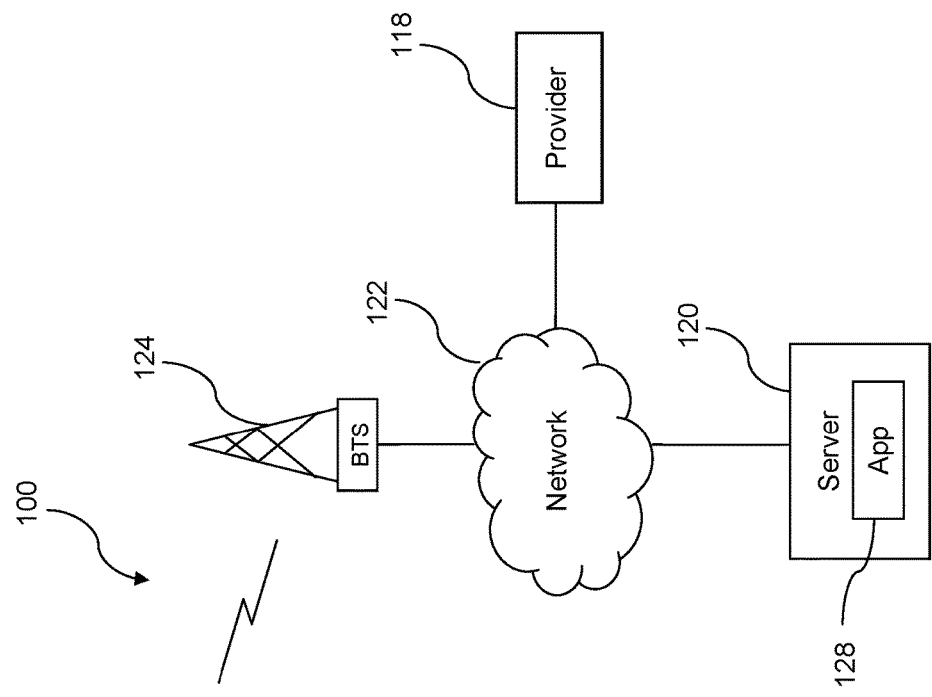
FIG. 1 is an illustration of a communication system according to an embodiment of the disclosure.
Figure 1:
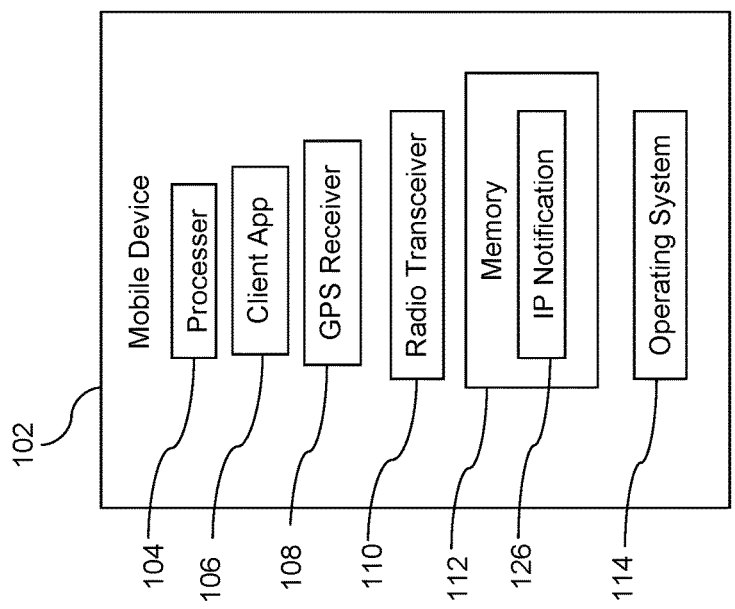

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Problems may occur when wireless communications service providers try to send real time internet protocol notifications to mobile communication devices without true push architecture—for example the internet protocol notification may not be delivered on time. Real time internet protocol notifications may be sent within about 5 minutes of an event, about 1 minute of an event, about 20 seconds of an event, or within another time period of an event. With push technology, the request for a communication transaction between a server and a client is initiated by the information publisher or the server. On the other hand, with pull technology, the request for the transmission of information is initiated by the information receiver or the client.

The standard approach to configuring the operating system kernel of a general purpose server computer may be to set a limit on the number of file handles available for establishing network connections to about $2^{20}$ (e.g., 1,048,576) or a like number. It is an insight of the present disclosure that for the specific purpose of supporting true push of internet protocol notifications, the performance of servers can be improved by eliminating this limit and instead configuring the operating system kernel of the server with a file handle limit determined by an algorithm taking into account the CPU configuration of the server, the memory of the server, and other hardware resources of the server. This algorithmic determination of file handle limit may make many more file handles available for use while avoiding the challenges of not configuring any limit on file handles. Likewise, the operating system kernel of general purpose computers are typically configured to support multi-processing using what is commonly referred to as concurrent processes and context switching between processes, possibly numerous processes. It is another insight of the present disclosure that for the specific purpose of supporting push of internet protocol notifications, as described more fully hereinafter, the operating system kernel of the server may be configured to execute only a single process/thread—the process that pushes internet protocol notifications. One skilled in the art will appreciate how unusual is this restriction of a powerful server to executing only a single process. These unusual configurations of operating system kernel parameters may provide efficiencies that allow fewer servers to perform true push for internet protocol notifications than would otherwise be needed if the servers were configured in the standard way and as recommended by most server vendors for standard server operations.

The problems may occur because the internet protocol notification may be realized by pull technology and because the internet protocol notifications are staggered and delivered once or a few times over a period of time instead of whenever it is desired. The difficulties of realizing true push architecture for internet protocol notification may lie in keeping a large number of live concurrent network connections between the server and the mobile communication devices. For example, when a conventionally configured kernel of a server is utilized as is, the server may not be optimized for input/output purposes as may be desirable for the true push functionality. The present disclosure teaches a method for adjusting the operating system kernel parameters to optimize server computers for input/output performance and implementing true push architecture for internet protocol notifications on server computers.

For example, the physically addressable size of random access memory and the number of central processing unit cores may be determined for kernel parameter settings in an automated manner, for example by a computer application. The operational or system overhead may also be included into consideration by the computer application for determining the kernel parameter settings. The resource limit parameters in the kernel, for example the limit for the total number of file handles in the entire system, may be set by the computer application based on the physically addressable size of the random access memory, the number of central processing unit cores, the system overhead, and/or another hardware or software factor. The limit for the number of open input files in the entire system, the limit for the number of open output files in the entire system, and the limit for the number of concurrent network connections may be set by the computer application based on the physically addressable size of random access memory and the number of central processing unit cores.

In addition, the kernel parameters that define the limit for the number of open files by a single process, the maximum size of a shared memory segment, the minimum size of a shared memory segment, and the total amount of shared memory available in the entire system of the server may be determined and set by the computer application. The maximum number of shared memory segments per process, the maximum number of shared memory segments, or another resource limit may be set by the computer application. In an embodiment, the kernel parameters are automatically set to values by the computer application so that the random access memory may be utilized instead of disk memory. The memory page allocation may be tied to the settings of the kernel parameters by the computer application. The central processing unit core affinity may be set to a single thread and/or to a single process by the computer application to avoid context switching between applications. In an embodiment, thread and process are equivalent for the true push internet protocol notification system. This way, the server computer may be optimized for input/output performance to maintain a large number of live concurrent network connections that may realize true push for internet protocol notifications.

Turning now to FIG. 1, a communication system 100 is described. In an embodiment, the system 100 comprises a plurality of mobile communication devices 102. The device 102 may comprise a processer 104, one or more client applications 106, a global positioning system (GPS) receiver 108, a radio transceiver 110, a memory 112, and an operating system 114. Internet protocol notifications may be stored in the memory 112 when received at the mobile communication device 102. The device 102 is configured to use the radio transceiver 110 to establish a wireless communication link with a base transceiver station (BTS) 124, and the base transceiver station 124 provides communications connectivity of the device 102 to a network 122. One or more servers 120 that are coupled to one or more provider servers 118 may also have access to the network 122. The provider server 118 may be a third party publisher and may publish the internet protocol notifications 126 to the server 120. For example, the provider server 118 may be a server from a company that desires to promote its products with push internet protocol notifications. The server 120 may then push the internet protocol notifications 126 that are received from the provider server 118 to the mobile device 102. The network 122 may comprise any combination of private and public networks.

It is understood that the system 100 may comprise any number of mobile communication devices 102 and any number of base transceiver stations 124. The collectivity of base transceiver stations 124 may be said to comprise a radio access network, in that these base transceiver stations 124 may provide a radio communication link to the mobile communication devices 102 to provide access to the network 122. The radio access network may be abstracted in different ways and may comprise, in addition to the base transceiver stations 124, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

The radio transceiver 110 may communicate with the base transceiver station 124 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. The device 102 may be any of a mobile phone, a personal digital assistant (PDA), a media player, a wireless enabled computer, or other mobile communication device. In an embodiment, the mobile communication device 102 may have other components (not shown) such as a near field communication (NFC) radio transceiver, a wireless local area network (WLAN) radio transceiver, or other components.

The location of the mobile communication device 102 may be determined in a variety of ways. For example, the locating process may be accomplished in a network-based manner, in a handset-based manner, in a hybrid manner that involves both the network-based technologies and handset-based technologies, or in another manner for mobile communication localization.

In a network-based localization system, nearby base transceiver stations 124 may take some signal parameter measurements and relay the measurements to a data fusion center where the measurements are processed and the location of the mobile communication device 102 is determined. In a handset-based localization system, some client software may be installed on the mobile communication device 102 to determine the location of the mobile communication device 102. In an embodiment, the mobile communication device 102 may compute its location by cell identification, signal strength of the home and neighboring cells and send the location information back to the server 120. If the mobile communication device 102 is also equipped with a GPS receiver 108, then more precise location information may be sent from the mobile communication device 102 to the server 120. In a hybrid mechanism, a combination of network-based and handset-based technologies are used for location determination of the mobile communication device 102.

The server 120 may compare the location of the mobile communication device 102 with geo-fences on a map. The map may be a mathematic abstraction of an area. For example, the map may comprise triangles, quadrangles, hexagons, or another regular or irregular shape with their edges as geo-fences. The map may be defined by the coordinates of the vertices of the figures or polygons. The map may be a combination of different regular and/or irregular shapes with their edges as geo-fences. The map may cover a certain area around certain points of interest, for example the map may cover the areas within a radius of 1 mile, 3 miles, 10 miles, or another radius around the nearest three base transceiver stations 124 from the mobile communication device 102. The map may gradually or discretely change to another map when the mobile communication device 102 travels. A geo-fence may be a user-defined virtual perimeter for a geographic area. For example, a geo-fence on the map that the server 120 utilizes here may be a virtual perimeter of a particular store territory or a brand territory on the map. The range of the geo-fence around a brand or store may vary based on the brand or store. For example, the geo-fence of a high-end grocery store may be a circle with a radius of 3 miles around the high-end grocery store. As another example, a geo-fence for a coffee shop may be a circle with a radius of half a mile around the coffee shop. The range of the geo-fence may also vary when the user of the mobile communication device 102 is traveling in different ways. For example, the geo-fence may be a circle with a radius of half a mile around the coffee shop when the user of the mobile communication device 102 is driving. The geo-fence may be a circle with a radius of 50 feet around the coffee shop when the user of the mobile communication device 102 is walking. When the mobile communication device 102 is detected by the server 120 to have entered a geo-fenced area, the server 120 may send an internet protocol notification 126 to the mobile communication device 102. The internet protocol notification 126 may be a coupon, a voucher, an offer, or a reward program status from a brand or store.

The total number of the internet protocol notifications 126 sent to a single user may be limited to a predefined amount within a predefined period of time. For example, the total number of the internet protocol notifications 126 may be limited to two per day, five per day, ten per day, or another number for each day. The total number of internet protocol notification 126 may be limited to 20, 50, or 100 a month, or another amount for each month. The user may opt out of the subscription of the internet protocol notification 126 by any brand or store from the server 120 at any time. The user may choose to subscribe to only some of the internet protocol notifications 126 the server 120 publishes.

When the internet protocol notification 126 is received at the mobile communication device 102, the internet protocol notification 126 is placed in the memory 112 for immediate action. For example, the internet protocol notification 126 may be forwarded to a display application at the mobile communication to display at the minimum possible delay. The corresponding client application 106 to the internet protocol notification 126 may also be notified by the mobile communication device 102 and take further action at the minimum delay.

Figure 2:
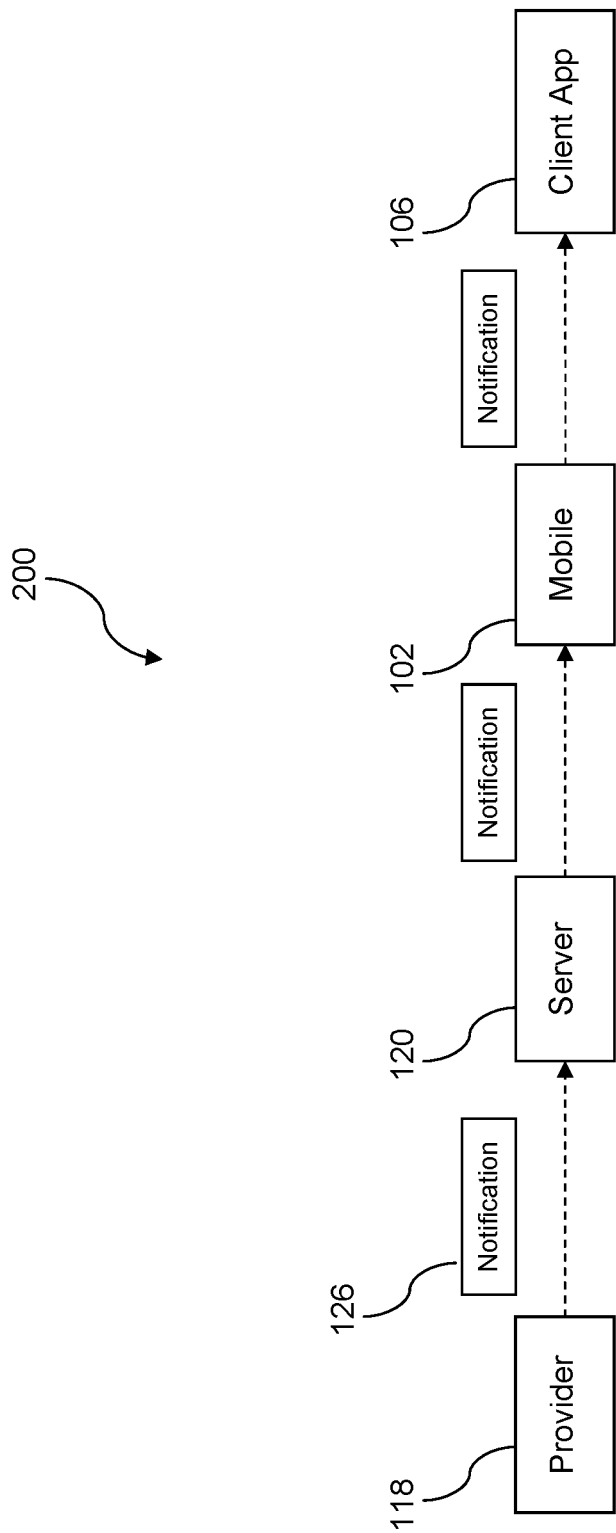
FIG. 2 is an illustration of a message flow of a communication system according to an embodiment of the disclosure.

Turning now to FIG. 2, a communication system 200 is described. In an embodiment, an internet protocol notification 126 may be published by a provider server 118. A server computer 120 may retrieve the internet protocol notification 126 from the provider server 118. The server 120 may then send the internet protocol notification 126 to a mobile communication device 102 if the mobile communication device 102 subscribes to the internet protocol notifications 126 from the provider server 118. At the mobile communication device 102, the internet protocol notification 126 may be displayed by a screen of the mobile communication device 102. Additionally, the internet protocol notification 126 may be forwarded to a client application 106 that is corresponding to the provider server 118 and the internet protocol notification 126 for further action.

Figure 3:
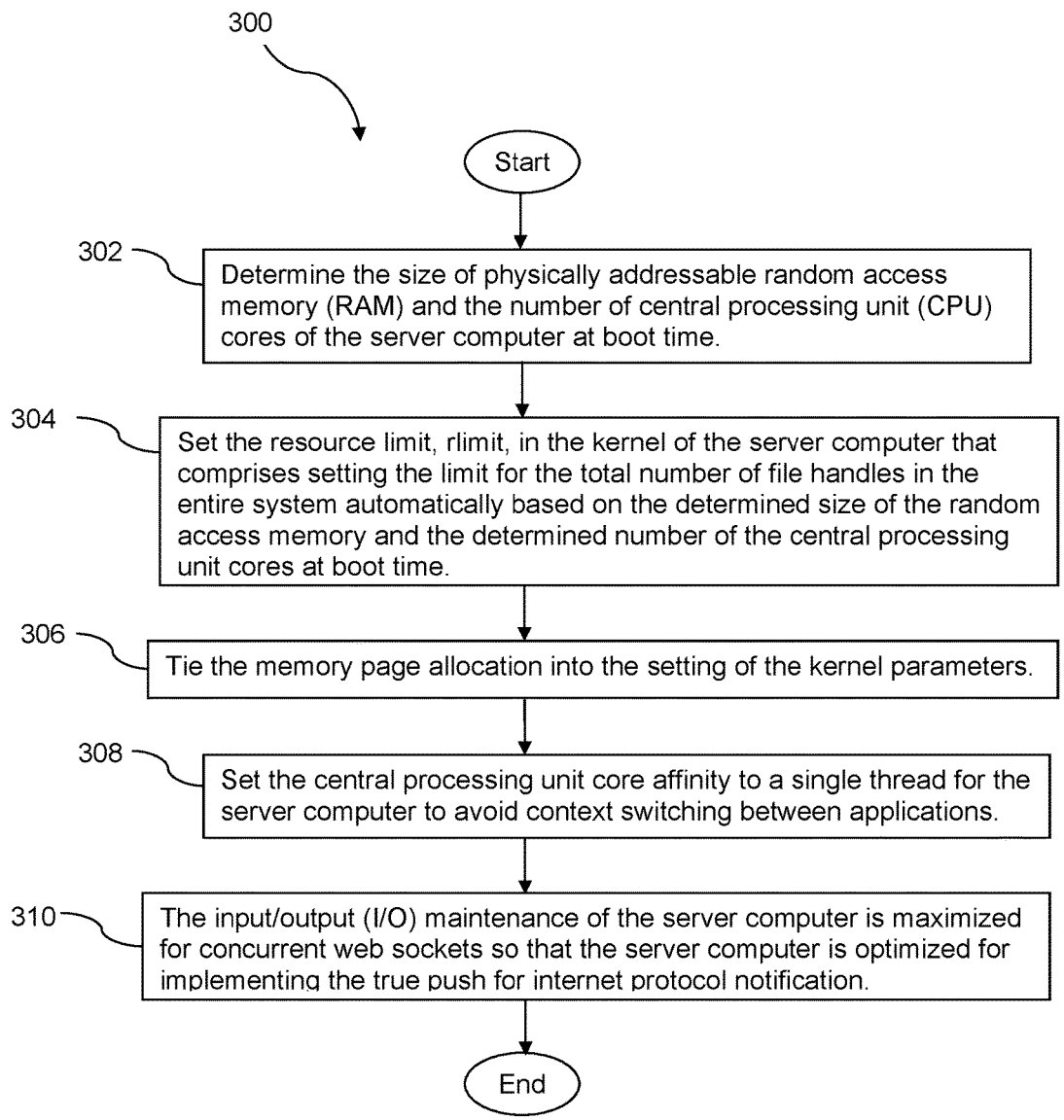
FIG. 3 is a flow chart illustrating a method according to an embodiment of the disclosure.

Turning now to FIG. 3, a method 300 is described. At block 302, the size of physically addressable random access memory (RAM) and the number of central processing unit (CPU) cores of the server computer are determined at boot time. In an embodiment, the process of determining the size of the physically addressable random access memory and the number of the central processing unit cores at boot time may be accomplished in an automated manner. For example, an application on the server computer, for example the application 128 in FIG. 1, may examine the size of the physically addressable random access memory and the number of the central processing unit cores at boot time for further action. In an embodiment, the size of the physically addressable random access memory in the entire system of the server, for example the server 120 in FIG. 1, is examined before the conventionally configured limit for the file handles is changed so that the random access memory may be utilized instead of the disk memory for the internet protocol notification architecture. The speed of accessing the random access memory is much faster than the disk memory and so by utilizing the random access memory instead of the disk memory, better performance of the internet protocol notification service may be achieved.

The size of the physically addressable random access memory and the number of central processing unit cores may be utilized with the operational or system overhead to determine the value of some kernel parameters. The operational or system overhead may be the hardware and/or software cost for the operating system without other applications running on the server. For example, the upper bound of the number of open file descriptors or file handles of the entire system, the upper bound of the number of open file descriptors or file handles per process, or the upper bound of the number of open file descriptors or file handles per thread is limited based on the available physically addressable random access memory.

In an embodiment, two file handles may be utilized to keep a communication session, for example, a transmission control protocol session, alive at all times. When a large number of concurrent open transmission control protocol connections are in need, it benefits the true push internet protocol notification system to set the limit for the total number of file handles in the entire system to the maximum number consistent with the hardware and/or software limits.

At block 304, the resource limit, rlimit, in the kernel of the server computer is set that comprises setting the limit for the total number of file handles in the entire system automatically based on the determined size of random access memory and the determined number of the central processing unit cores at boot time. For example, the application 128 in FIG. 1 may automatically set the resource limit in the kernel based on the determined size of random access memory, the determined number of central processing unit cores, and the operational or system overhead. For example, the limit for the number of file handles is determined based on the size of the random access memory, the number of central processing unit cores, and the system overhead. To push internet protocol notifications in real time, network connections between the server and the client may desire to be kept open for all times as long as the server is up. If a network connection is initiated when it is needed instead of being kept open for all times, much time may be wasted establishing the connection.

In an embodiment, if there are a large number of devices subscribing to real-time push notifications, a large number of concurrent open connections may be involved. To provide a large number of concurrent connections using servers with conventionally configured kernels involves having too many server computers and hence an inefficient use of capital equipment. The conventionally configured kernel parameters may be removed and new kernel parameters may be determined based on the size of the physically addressable random access memory, the number of central processing unit cores, and the operational or system overhead. Average servers come with conventionally configured kernel parameters that are set for different uses. For example, these conventionally configured kernels may be designed for multi-process environment. Conventionally configured kernels may not be appropriate or optimal for single-process environment, for example for true push architecture for internet protocol notifications. Hence, it may make sense to change the kernel parameters to meet the specific needs of the server with true push architecture.

The limit for the total number of file handles may limit the total number of open files in the entire system. The limit of the number of open input files is set to the maximum number consistent with the random access memory size. The limit of the number of open output files is set to the maximum number consistent with the random access memory size. The limit for the number of concurrent network connections is set based on the number of the central processing unit cores and the size of the random access memory determined at boot time. In addition, the limit for the number of concurrent transmission control protocol connections is set based on the size of the random access memory determined at boot time. In an embodiment, the limit for the total number of open files by a single process may be set. Other kernel parameters may also be changed based on the determined size of the random access memory, the determined number of the central processing unit cores, and the system overhead at boot time.

At block 306, the memory page allocation is tied into the setting of the kernel parameters. In an embodiment, this step is also conducted by the application 128 automatically. Some shared memory related limits of the server may be set to achieve better input/output performance. For example, the maximum size of a shared memory segment, the minimum size of a shared memory segment, the total amount of shared memory available, the maximum number of shared memory segments per process, the maximum number of shared memory segments in the entire system, semaphores that allow different processes to synchronize their access to certain resources, or another shared memory related limit may be set.

At block 308, the central processing unit core affinity is set to a single thread for the server computer to avoid context switching between applications. For example, the application 128 may set the central processing unit core affinity to a single thread or a single process. Each central processing unit core may be coupled to a single thread. Multi-threads may not be coupled to the same central processing unit core. With the central processing unit core affinity set to a single thread, context switching between applications may be avoided. Context switching may significantly slow down the application processing by the central processing units. Hence, avoiding context switching may accelerate the processing of applications.

At block 310, the input/output (I/O) maintenance of the server computer is maximized for concurrent web sockets so that the server computer is optimized for implementing the true push for internet protocol notification. With blocks 302 through 308, the input/output maintenance of the server may be maximized. For the true push for internet protocol notifications, the server may maintain a large number of live network connections with the mobile communication devices to which the server wants to push internet protocol notifications. The true push architecture may also introduce a large number of input/output operations with the live network connections. A web socket or network socket is network interface, an endpoint of an inter-process communication flow across a computer network. The address of a web socket is the combination of an internet protocol address and a port number. For example, the input/output maintenance may be maximized when predominantly dormant web sockets are present. Predominantly dormant web sockets are web sockets that are connected but with no traffic going through. Web connections may be kept alive so that internet protocol notifications may be pushed to the mobile communication devices at the minimum possible delay when it is entailed. However, no traffic may go through most of the connected network connections most of the time. Thus, maximizing the input/output maintenance may benefit the server when predominantly dormant web sockets are present.

Figure 4:
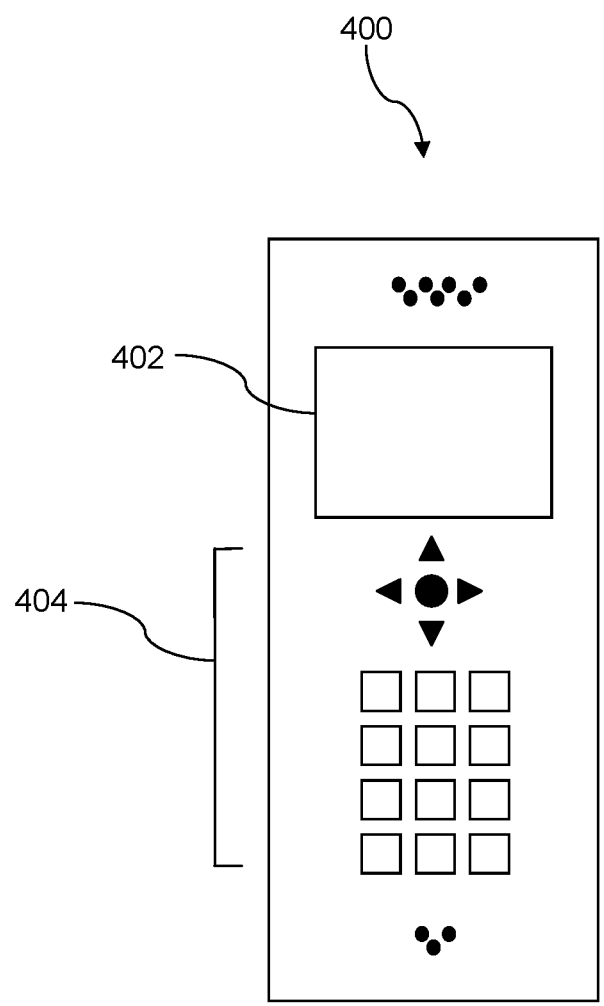
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
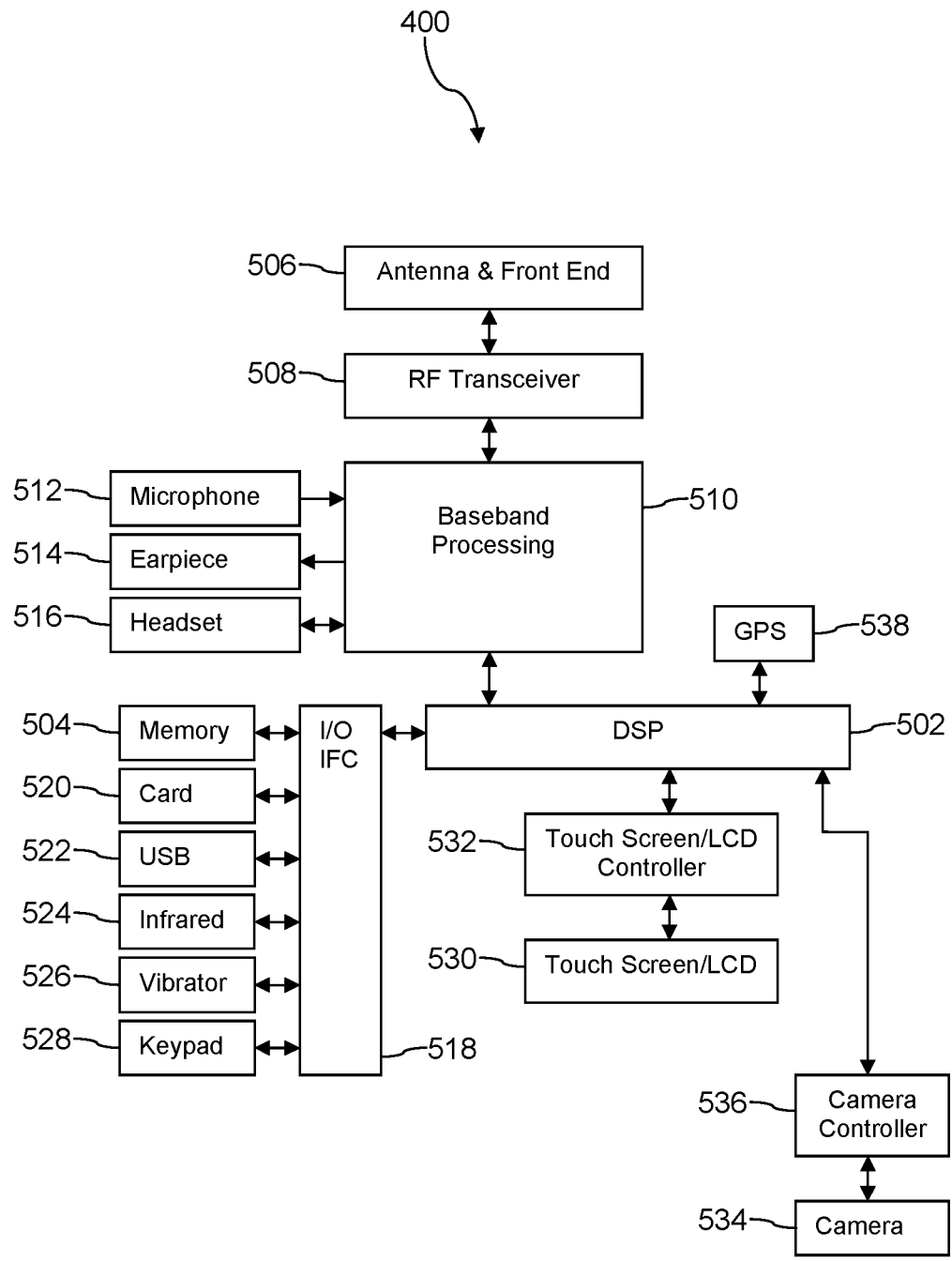
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
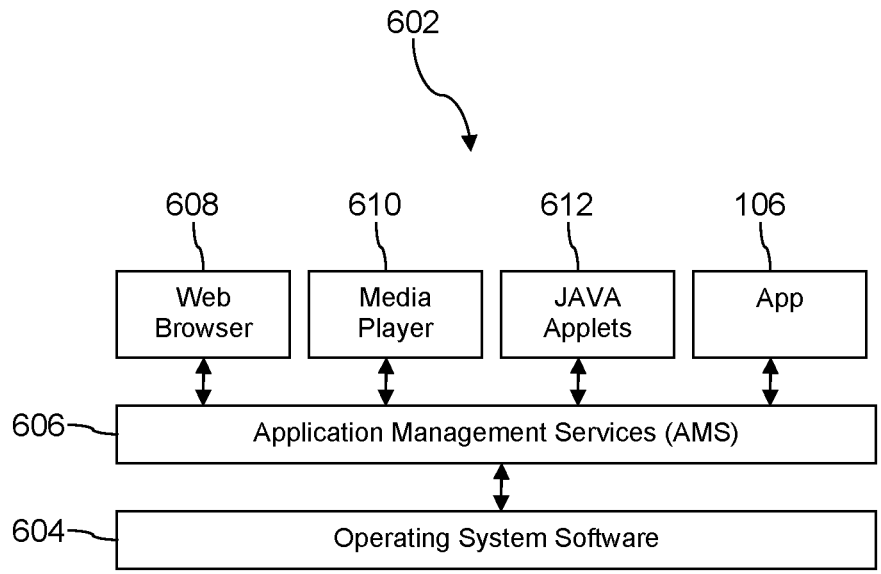
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
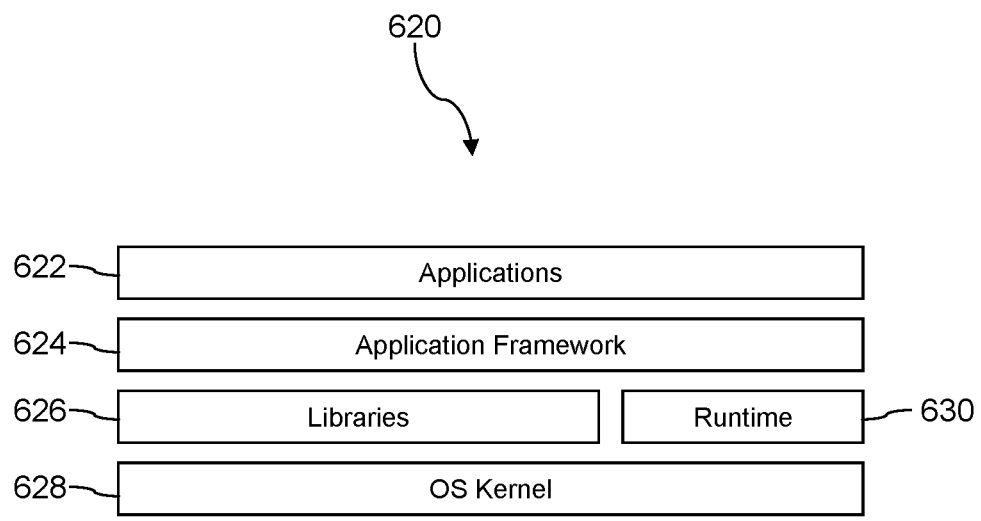
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
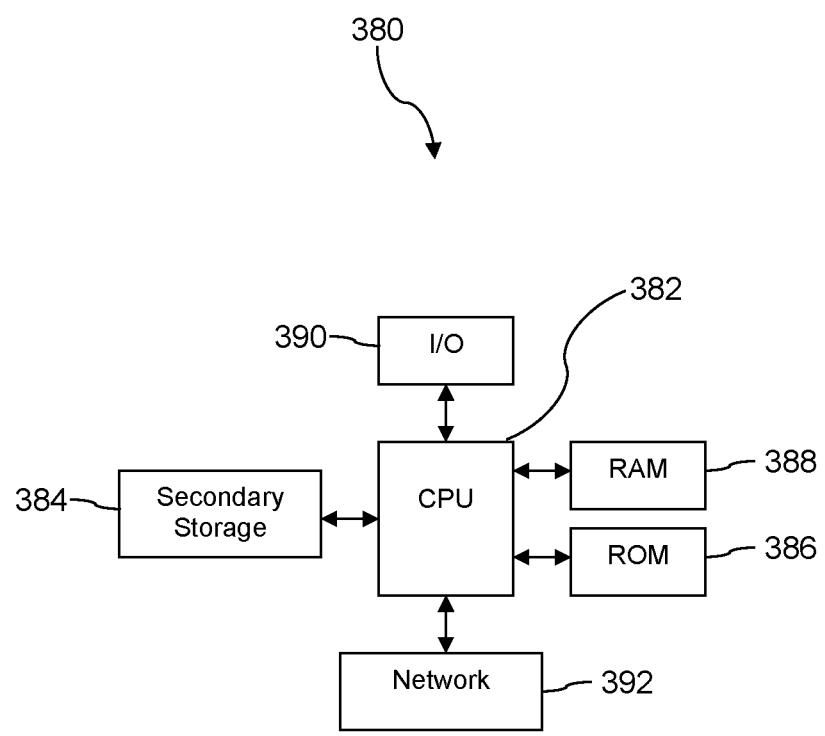
FIG. 7 is a block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of true push for internet protocol notification implemented by at least one server computer, comprising:
    determining, by an application stored in a non-transitory memory of a server computer and executed by a processor of the server computer, a size of physically addressable random access memory and a number of central processing unit cores of the server computer at boot time;
    changing, by the application, parameters on a kernel of the server computer based on the size of the physically addressable random access memory and the number of central processing unit cores at boot time; and
    setting, by the application, central processing unit core affinity to a single thread for the server computer to avoid context switching between applications,
    whereby input/output maintenance of the server computer is maximized so that the server computer is optimized for implementing the true push for internet protocol notification.

2. The method of claim 1, wherein a conventionally configured limit of a total number of file handles is removed for an entire system of the server computer.

3. The method of claim 2, wherein a limit for a number of file handles in the entire system is determined based on the number of central processing unit cores, the size of the random access memory, and the entire system overhead.

4. The method of claim 1, wherein a limit for a number of open input files is set to a maximum number consistent with the random access memory size.

5. The method of claim 1, wherein a limit for a number of open output files is set to the maximum number consistent with the random access memory size.

6. The method of claim 1, wherein a limit for a number of concurrent network connections is set based on the random access memory size determined at boot time.

7. A method of true push for internet protocol notification to a mobile communication device implemented by at least one server computer, comprising:
    setting, by an application stored in a non-transitory memory of a server computer and executed by a processor of the server computer, central processing unit core affinity to a single thread for the server computer to avoid context switching between applications, whereby input/output maintenance of the server computer is maximized for concurrent web sockets so that the server computer is optimized for implementing the true push for internet protocol notification.

8. The method of claim 7, further comprising determining, by the application, a size of physically addressable random access memory and a number of central processing unit cores of the server computer at boot time.

9. The method of claim 8, further comprising setting, by the application, a limit for a number of concurrent transmission control protocol connections based on the size of the random access memory determined at boot time.

10. The method of claim 8, wherein a conventionally configured limit for a total number of file handles on an entire system of the server computer is removed and an algorithmically defined limit is set automatically based on the determined size of the physically addressable random access memory and the determined number of central processing unit cores of the server at boot time.

11. The method of claim 10, wherein the size of the physically addressable random access memory in the entire system of the server is examined before the conventionally configured limit for the file handles is changed to ensure the random access memory instead of a disk memory is used in the internet protocol notification architecture to achieve faster server performance.

12. The method of claim 8, further comprising setting, by the application, a limit for a total number of open files by a single process.

13. The method of claim 8, further comprising setting, by the application, at least one of: a limit for a maximum size of a shared memory segment, a limit for a minimum size of a shared memory segment, or a limit for a total amount of shared memory available in the server computer.

14. The method of claim 8, further comprising setting, by the application, at least one of: a limit for a maximum number of shared memory segments per process, a limit for a maximum number of shared memory segments in an entire system of the server computer, or a limit for semaphores in the entire system of the server computer.

15. A method of true push for internet protocol notification to a mobile communication device implemented by at least one server computer, comprising:

tying, by an application stored in a non-transitory memory of a server computer and executed by a processor of the server computer, a memory page allocation into a setting of kernel parameters, whereby input/output maintenance of the server computer is maximized for concurrent web sockets so that the server computer is optimized for implementing the true push for internet protocol notification.

16. The method of claim 15, further comprising:

determining, by the application, a size of physically addressable random access memory and a number of central processing unit cores of the server computer at boot time; and changing, by the application, parameters on a kernel of the server computer based on the size of the physically addressable random access memory and the number of central processing unit cores at boot time.

17. The method of claim 16, wherein a limit for a number of open input files is set to a maximum number consistent with the random access memory size.

18. The method of claim 16, wherein a limit for a number of open output files is set to the maximum number consistent with the random access memory size.

19. The method of claim 16, wherein a limit for a number of concurrent network connections is set based on the random access memory size determined at boot time.

20. The method of claim 16, wherein a limit for a number of file handles in an entire system is determined based on the number of central processing unit cores, the size of the random access memory, and the entire system overhead.

* * * * *